April 13, 1965     C. W. HIGHBERG     3,177,624
DIAMOND GRINDING OF GLASS

Original Filed Aug. 18, 1960     6 Sheets-Sheet 1

INVENTOR.
CARLE W. HIGHBERG
BY
*Roger J. Drew*
ATTORNEY

April 13, 1965 C. W. HIGHBERG 3,177,624
DIAMOND GRINDING OF GLASS
Original Filed Aug. 18, 1960 6 Sheets-Sheet 2

INVENTOR.
CARLE W. HIGHBERG
BY
ATTORNEY

April 13, 1965   C. W. HIGHBERG   3,177,624
DIAMOND GRINDING OF GLASS
Original Filed Aug. 18, 1960   6 Sheets-Sheet 5

INVENTOR.
CARLE W. HIGHBERG
BY
ATTORNEY

April 13, 1965 C. W. HIGHBERG 3,177,624
DIAMOND GRINDING OF GLASS
Original Filed Aug. 18, 1960 6 Sheets-Sheet 6

INVENTOR.
CARLE W. HIGHBERG
BY
ATTORNEY

United States Patent Office 3,177,624
Patented Apr. 13, 1965

3,177,624
DIAMOND GRINDING OF GLASS
Carle W. Highberg, Murray Hill, N.J., assignor to Engelhard Hanovia, Inc., Newark, N.J., a corporation of New Jersey
Original application Aug. 18, 1960, Ser. No. 50,352. Divided and this application July 18, 1961, Ser. No. 124,844
4 Claims. (Cl. 51—110)

This invention relates to glass grinding, and more particularly to the grinding of glass with diamond grinding wheels.

This application is a division of application Serial No. 50,352, filed August 18, 1960, now abandoned.

In accordance with present day techniques for manufacturing plate glass, the plate glass surface is processed at each of a very large number of successive grinding and polishing stations spaced along a conveyor line. In one typical installation, glass sheet having a width of 96 inches is continuously extruded from a melting furnace. Following passage through an annealing chamber, the plate glass is passed through 28 successive beach sand grinding stations. At each of these stations, the grinding operation is accomplished by large grinding heads having vertically mounted spindles, which have horizontal grinding surfaces extending across the 96 inch width of the plate glass. Following the 28 beach sand grinding stations, 42 additional polishing stations are required. The polishing heads also have vertical spindles, and rouge or iron oxide is employed as an abrasive.

The conveyor rate for the known process is between 170 and 180 inches per minute, and the total glass removed is about 0.025 inch. The surface finish at the end of the beach sand grinding stages is about 16 to 18 microinches, on a root mean square basis, and at the end of the polishing operations, it is significantly less than one micro inch R.M.S. As noted above, to obtain these results 70 stations, each including a rotary grinding wheel at least 96 inches in diameter, have been required for the surfacing of one side of the glass sheet.

This prior art process for grinding plate glass has the obvious disadvantage that a large amount of expensive machinery and floor space is required. Furthermore, the facilities and manpower required for handling the bulky abrasives are very costly. It is, therefore, a principal object of this invention to reduce the amount of floor space, machinery, and materials handling expenses, required in the processing of plate glass, and to reduce the cost of the entire operation.

In general, this may be accomplished by replacing two-thirds or more of the seventy stages of grinding and polishing which are now being used with a lesser number, such as fifteen or less, stages of diamond grinding. With proper successive diamond grinding stages as described below, great savings may be realized by eliminating many of the large number of stages which are now required in the processing of plate glass. Furthermore, it is interesting to note that, while diamonds are commonly considered to be expensive, the actual cost of diamonds per cubic inch of removed glass is actually less than the cost of the beach sand or rouge abrasives which are now in use.

In accordance with one important feature of the present invention, it has been determined that the diamond concentration, in terms of carats per cubic inch of grinding wheel matrix, should be relatively low in the case of the initial heavy cuts of glass. More specifically, it has been determined that concentrations of less than twenty, and preferably about ten carats per cubic inch are desirable for the initial cuts.

With regard to the heavy initial cuts, other representative specific operating conditions may typically include a feed speed of 200 inches per minute of the glass relative to the grinding wheel, and a cut of about 0.006 or 0.004 inch. The grit size may be approximately the 50 to 60 grit size, having an average particle size of about 275 microns. In this regard it is noted that larger grit sizes of the order of the 20 to 30 grit size tends to cause excessive chipping at the edges, and breakage of plate glass. The foregoing specific data included in this paragraph indicates the orders of magnitude which are involved; broader ranges are set forth below in the present specification and claims.

In accordance with another feature of the invention, the concentration of diamonds per cubic inch should be increased in successive grinding stages, with reduction in the depth of the cuts and also with the corresponding reduction in diamond particle size.

In accordance with a further feature of the invention, a diamond grinding wheel includes a generally circular support, and a large number of diamond segments mounted to form a grinding plane extending generally perpendicular to the axis of the support. The grinding surface of the segments may be very small, and the segments may be adjustable to provide various effective diamond grinding wheel widths, such that wheel life, or efficiency, may be extended for various grinding conditions.

When the method and arrangements described in the present specification are followed, an unexpectedly high efficiency, or wheel life, in terms of removal of glass per carat of diamond, is achieved. In accordance with the present invention, this wheel life is in the order of 2600 or more cubic inches of glass removed per carat of diamond. With this long wheel life, in combination with the elimination of many stages of processing as discussed above, the process of the present invention is significantly more economical than prior processes.

Other objects, features and advantages of the present invention will become apparent from a consideration of the following detailed description and from the accompanying drawings, in which, FIGS. 1 and 2 represent a single diamond grinding station for use in processes and systems of the present invention;

Figure 17:
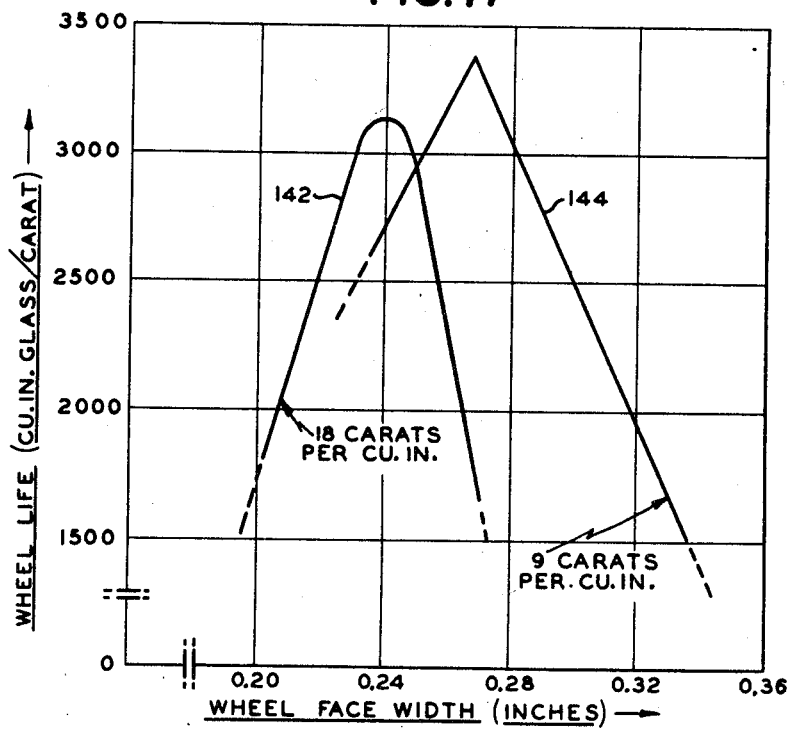
Figure 7:
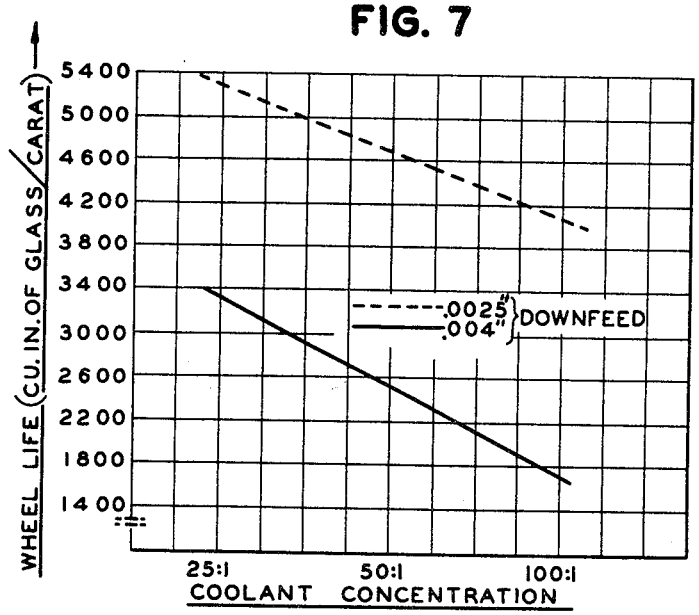
Figure 8:
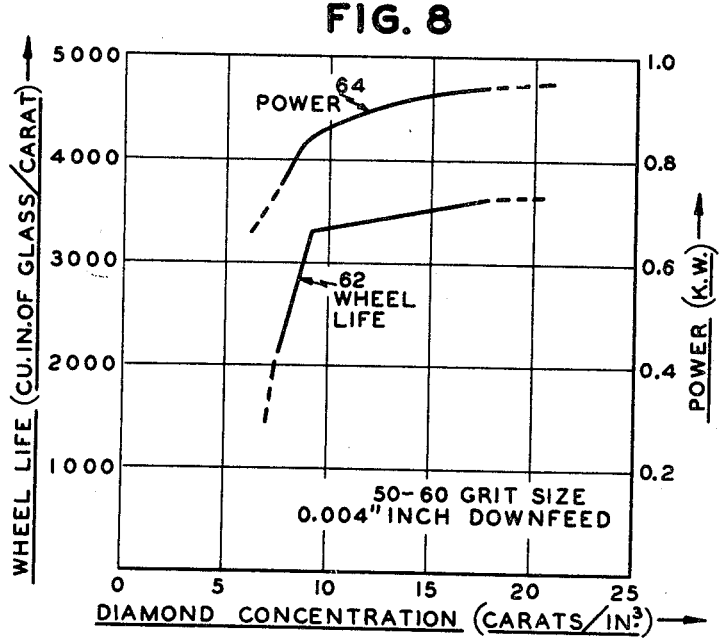
Figure 9:
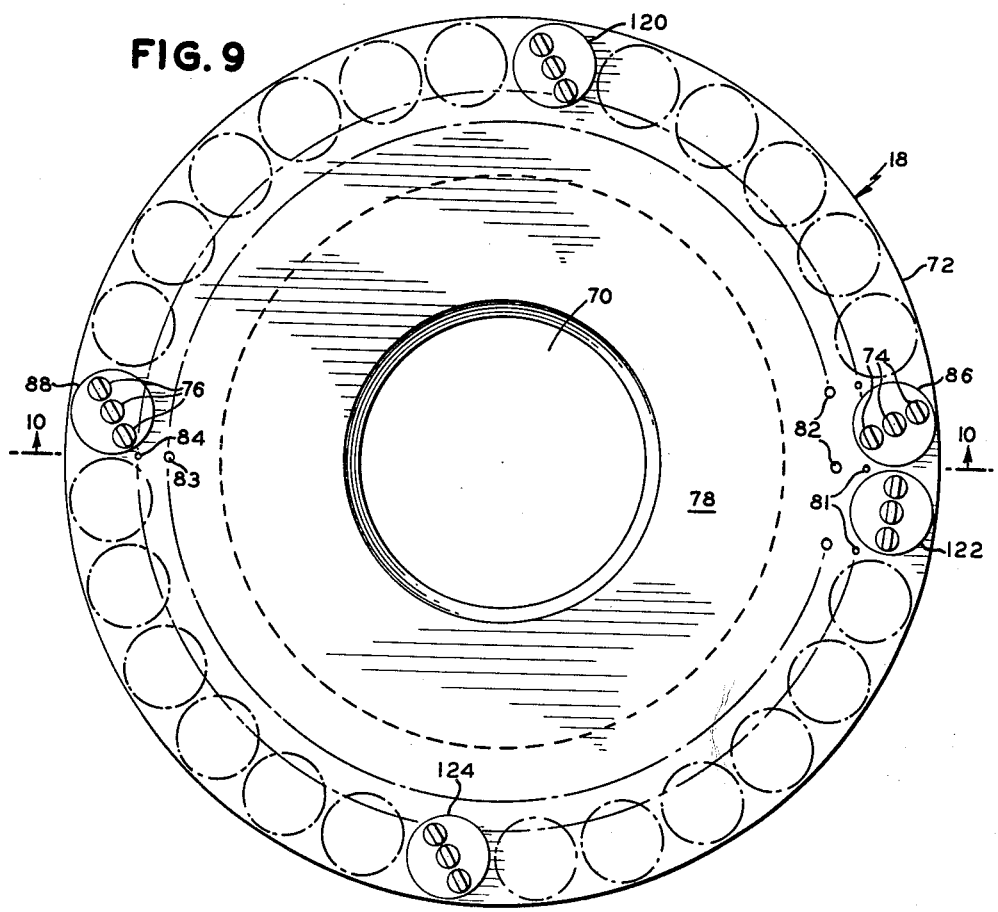
Figure 10:
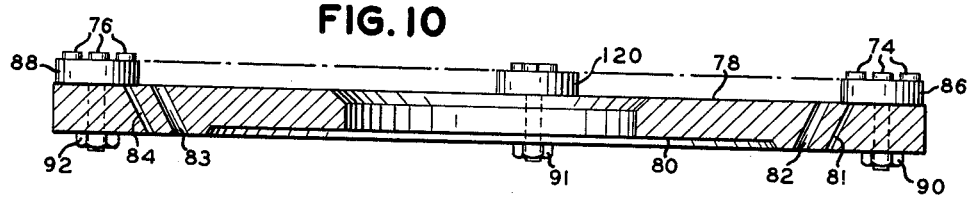
Figure 16:
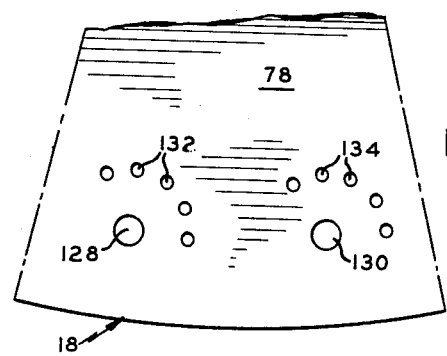
Figure 11:
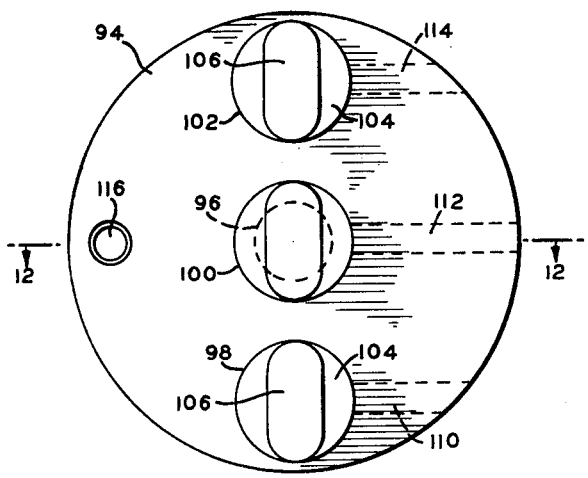
Figure 13:
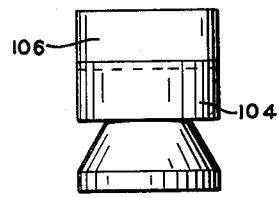
Figure 14:
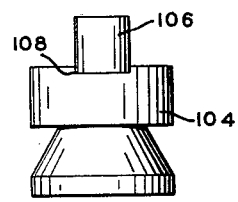
Figure 12:
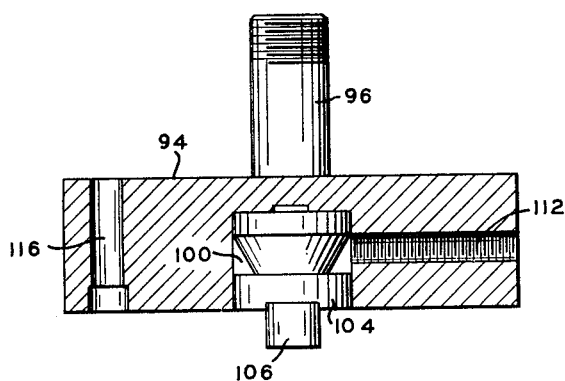
Figure 15:
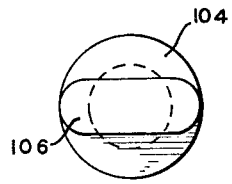

FIG. 7 includes two plots indicating the effect of coolant concentration on wheel life for diamond grinding wheels;

FIG. 8 shows, in two plots, the effect of diamond concentration on wheel life and power;

FIGS. 9 and 10 are two views of a diamond wheel support member and the additional elements required to support the diamond grinding segments, in accordance with this invention;

FIGS. 11 and 12 show the details of the segment holders, the diamond segment mounts, and the individual diamond segments, which are assembled with the support of FIGS. 9 and 10;

FIGS. 13 through 15 show the construction of the individual diamond segments and their mounts;

FIG. 16 represents a portion of the grinding wheel support, particularly indicating the tapped holes which may be provided for adjusting the orientation of the diamond segments; and FIG. 17 includes two plots showing the effect of diamond wheel face width on wheel life.

Figure 1:
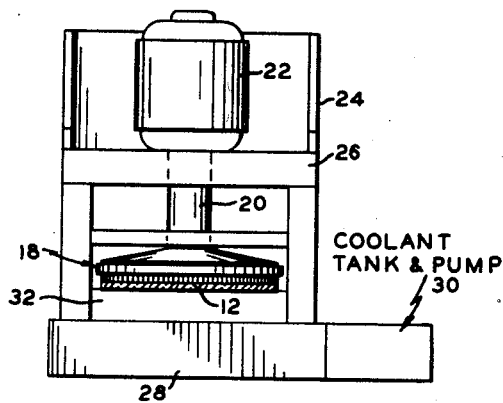
Figure 2:
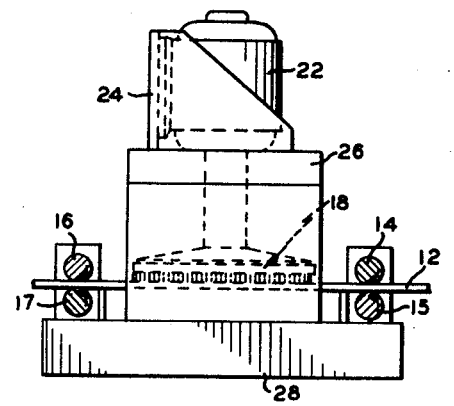

With reference to the drawings, FIGS. 1 and 2 are schematic showings of a grinding station in accordance with the principles of the present invention. A sheet of plate glass 12 is fed through the grinding station by any suitable means such as the driving rollers 14 through 17, as shown in FIG. 2. Alternatively, the glass may be blocked or clamped to a suitable supporting surface and may be fed with its supporting member through the grinding stage. The grinding stage includes a generally circular diamond grinding wheel 18 having a diameter greater than the width of the plate glass sheet 12. The grinding wheel 18 is mounted on a vertical spindle contained within the bearing housing as shown in FIG. 1. The wheel is driven by a motor 22 which may be mounted above the grinding wheel 18 on suitable supporting members 24. The motor supporting frame 24 is supported by the main frame 26 of the grinding stage which also supports the bearing housing 20 for the vertical spindle of the grinding wheel 18. The base 28 of the grinding stage provides a heavy rigid support for the entire apparatus. A suitable coolant tank and associated coolant pump 30 is provided for recirculating grinding coolant to the working surface between the grinding wheel 18 and the plate glass 12.

As discussed below, it is contemplated that plate glass may be ground and roughly polished from its initial rough state to a state in which the average surface variations are less than a few microinches, by approximately 14 stages of diamond grinding, each corresponding generally to the stage shown in FIGS. 1 and 2. With varying widths of plate glass, it is to be understood that the grinding stations will be larger or smaller, and that they will be modified in accordance with known machine tool practice to provide economical installations for any width of plate glass.

In the remainder of the present specification, the details of glass grinding with diamond grinding wheels will be considered. Before considering the test results and conclusions, a few brief paragraphs will be directed to defining the variables which are involved and the technical definitions of various terms which will be used.

Some of the basic variables are evident from a consideration of FIGS. 1 and 2. Thus, the conveyor speed for the glass sheet 12 is a first obvious variable, and the rate of rotation of the diamond grinding wheel 18 is another variable. The conveyor speed or rate of feed of the plate glass sheet 12 is normally given in terms of inches per minute. The present speed which is used in one known arrangement is about 175 inches per minute. While the present invention is applicable to lower speeds of advance, it is contemplated that speeds of 200 inches per minute or higher are also practical with the invention as described herein. The speed of rotation of the diamond wheel 18 in terms of revolutions per minute is not particularly significant, as the rate at which the grinding surface engages the plate glass is also dependent upon the radius of the wheel. With the diamond grinding surface being concentrated near the outer periphery of the wheel 18, a more useful figure is the rate at which the diamond grinding surface passes over and engages the plate glass, in terms of surface feet per minute. This is equal to the circumference of the wheel multiplied by the number of revolutions per unit time of the wheel. Thus, with the wheel having a diameter of about 10 feet, the rate of rotation is about 90 to 95 revolutions per minute in order to produce a relative velocity between the glass and the diamond grinding surface of about 2800 or 3000 surface feet per minute.

The amount of stock removed from the plate glass is determined principally by the spacing of the grinding wheel 18 from the bed 32 of the grinding stage. Under normal circumstances, this rate of stock removal will range from an initial cut of about 0.006 inch down to significantly less than 0.001 inch at the final stages of diamond grinding.

With regard to the diamond grinding material itself, a diamond grinding wheel is normally composed of small particles of diamond embedded in a matrix. The matrix is termed "the bond." Diamond wheels for the grinding of glass are normally made with metal bonds. One typical bond which has proved satisfactory includes approximately 60 percent copper, 24 percent zinc, 11 percent silver-copper solder, with the silver making up two-thirds to three-fourths of the solder, about 2 percent of iron and 1 percent of manganese. Other bonds including copper and tin and various combinations of the elements mentioned above, are also satisfactory. Steel bonded wheels may also be employed. In general, it is contemplated that a wide variety of bonds may be employed.

With regard to the diamond content in the abrasive material, both the size of the particles and the concentration of diamonds may be varied. The concentration of diamonds is normally expressed in terms of carats per cubic inch of matrix. A carat is equal to 200 milligrams. The highest diamond concentration which is normally available is about 110 carats per cubic inch; the most commonly used concentration is 72 carats per cubic inch.

With regard to grit size, commercial grade diamonds are generally available in grit sizes designated, for example, 50 to 60 grit or 30 to 40 grit. The grit size figure indicates that the diamond grit will pass through a screen of one mesh size but will not pass through a screen of the next mesh size. Thus, for example, 50 to 60 grit will pass through a 50 mesh screen but will not pass through a 60 mesh screen. There are several standards by which screens are identified; in the present specification the basis for the grit sizes is the U.S. Sieve Series. In many cases, the average particle size in terms of its diameter in microns is a more accurate figure than the grit size and will be used.

Another variable is the coolant concentration. To improve the life of the diamond wheel and to absorb heat from the grinding surface, as well as to carry away the ground glass particles, the grinding area is flooded with coolant. The coolant is conventional and includes oil and emulsifier which permits the formation of an oil in water emulsion, which serves as the coolant. The term "coolant concentration" as used in the present specification refers to the volume ratio of water to the concentrated coolant, including oil and an emulsifier. The grinding conditions vary to a considerable extent with changes in the coolant concentration. Thus, with lean coolant concentrations, having a low proportion of oil, lower diamond wheel life is usually obtained, while with higher proportions of oil, this trend is reversed.

The wheel life or efficiency of a diamond grinding operation may be measured in terms of cubic inches of glass removed per carat of diamond which is used. By the use of the diamond grinding conditions described in the present specification, a wheel life of 2600 or more cubic inches of glass per carat may be achieved.

Another factor which is important in evaluating the merits of a particular type of grinding wheel is the stress which is produced in the glass. Obviously, the chipping or breakage of glass which results from high stresses cannot be tolerated to any significant extent. When diamond particle sizes which are too large are employed, it has been found that chipping or breakage occurs. Similarly, high stresses are produced by using excessively high diamond concentrations when large amounts of stock are to be removed at early stages in the plate glass grinding process. In addition, lean coolant concentrations are accompanied by an increase in the grinding stresses. The spindle power which is absorbed is an indication of stress, and the likelihood of chipping or glass breakage.

The surface finishes referred to in the present case are in terms of the R.M.S. or root mean square average height of the profile of the glass, where the height is in terms of the departure from a centerline. Where a series of measurements are taken, the R.M.S. surface finish is computed by taking the square root of the sum of the squares of the heights divided by the number of measurements. This type of average gives greater weight to larger deviations from the centerline, and, in practice, gives values which are about 11 percent higher than the arithmetic average. A commercial profilometer is employed for these measurements.

Now that the basic terms employed in the diamond grinding of plate glass and in its evaluation have been defined, an overall process for producing finished plate glass and one specific process for the diamond grinding of plate glass will be described. In this regard, it is to be understood that the overall process and the diamond grinding sequence of steps are illustrative specific processes, and that departures from the specific matters set forth are contemplated and are to be expected in many cases.

Figure 3:
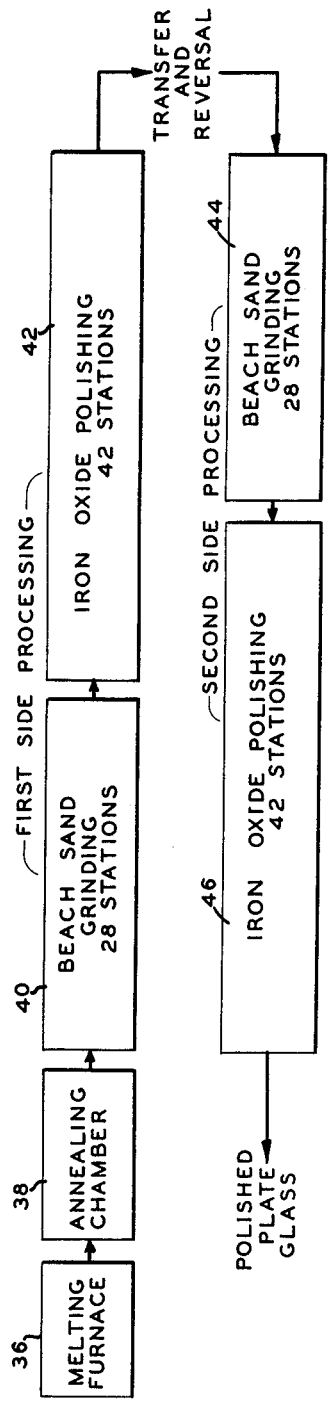
FIG. 3 represents a known plate glass finishing process.
Figure 4:
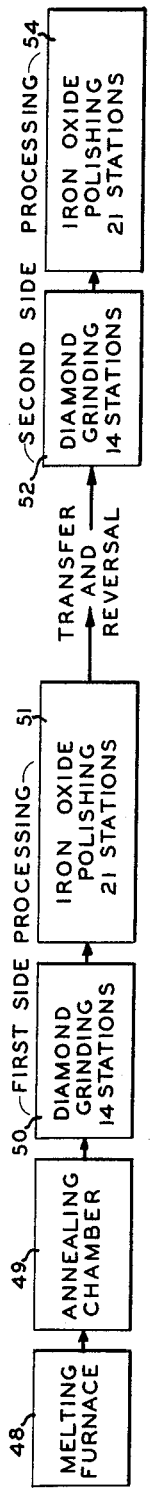
FIG. 4 is a diagram showing a process using diamond grinding and indicating the approximate number of stations which may be eliminated by the use of the present diamond grinding inventions.

With reference to FIGS. 3 and 4 of the drawings, FIG. 3 represents a known plate glass process, and FIG. 4 is a plate glass finishing process which includes diamond grinding steps in accordance with the present invention. In FIG. 3 the plate glass is produced in a continuous flat sheet from the melting furnace 36. The rate at which the glass is produced by the furnace 36 controls the speed of operation of the remaining steps in the finishing process. As mentioned above, this speed ranges upwardly from 150 inches per minute; in the case of the prior art system of FIG. 3, a speed of 175 inches per minute was employed, and in the present system of FIG. 4 a speed of 200 inches per minute is contemplated.

The plate glass from the melting furnace 36 is initially passed through an annealing chamber 38. From the annealing chamber, the glass is supplied first to the beach sand grinding stations 40 and subsequently to the iron oxide, or rouge, polishing stations 42. It may be noted that there are 28 beach sand grinding stations and 42 polishing stations, making a total a total of 70 stations. At the end of the polishing stations designated by the block 42, the surface of the glass has surface variations of less than one microinch R.M.S. on the first side, which has been completed. At the intermediate point between the beach sand grinding stations 40 and the polishing stations 42 the surface finish is in the range of 12 to 20 microinches R.M.S.

In some cases the plate glass is cut at the end of the annealing chamber 38 prior to passage to the beach sand grinding stations. It is then blocked or clamped and fed successively through the various grinding and polishing stations. Alternatively, the glass may be fed directly from the annealing chamber through the beach sand grinding and the polishing stations until the physical length of the manufacturing plant requires cutting and transfer of the plate glass sheets.

Following completion of polishing one side of the plate glass in the polishing stations 42, the plate glass is turned over, blocked and passed to the second stage processing apparatus including the beach sand grinding stations 44 and the iron oxide polishing stations 46. This completes the preparation of both sides of the sheets of plate glass.

In accordance with the present invention, the process shown in FIG. 4 also includes a melting furnace 48 and an annealing chamber 49. However, the first side processing includes 14 diamond grinding stations designated 50 and only 21 iron oxide, or rouge, polishing stations 51. Similarly, the second side processing operations include only 35 stations, of which 14 stations are the diamond grinding stations designated 52 and 21 stations are the rouge polishing stations designated 54, in FIG. 4. The surface finish following the diamond grinding stations 50 or 52 is less than three micro inches R.M.S.

In comparing the processes of FIGS. 3 and 4, it may be noted that the fourteen diamond grinding stations replace 28 beach sand stations and 21 rouge polishing stations, or a total of 49 stations. This is a reduction of more than three to one in this group of stations.

The nature of the grinding operations at each of the 14 stations is set forth in some detail in the following Table I. In this table the amount of stock removed, the grit size of the diamond abrasive, the corresponding average diamond particle size, and the resultant surface finish of the plate glass are specified.

*Table I*

| Station No. | Glass Removal (inches) | Grit Size | Average Particle Size (microns) | Surface Finish (microinches- R.M.S.) |
|---|---|---|---|---|
| 1 | 0.0060 | 50–60 | 275 | 180–230 |
| 2 | 0.0040 | 50.60 | 275 | 180–230 |
| 3 | 0.0040 | 50–60 | 275 | 180–230 |
| 4 | 0.0030 | 70–80 | 193 | 140–170 |
| 5 | 0.0020 | 100–120 | 137 | 90–110 |
| 6 | 0.0015 | 120–140 | 115 | 70–90 |
| 7 | 0.0013 | 140–170 | 96 | 60–70 |
| 8 | 0.0010 | 200–230 | 68 | 40–50 |
| 9 | 0.0007 | 270–325 | 48 | 25–35 |
| 10 | 0.0005 | 500 | 30 | 12–20 |
| 11 | 0.0003 | 850 | 15 | 8–12 |
| 12 | 0.00025 | 1,050 | 12 | 6–8 |
| 13 | 0.0002 | 1,250 | 10 | 4–6 |
| 14 | 0.0001 | 1,250–2,500 | 5–10 | 2–3 |

The foregoing data are contemplated for use in a plate glass processing scheme in which the glass is 120 inches in width, and the conveyor speed is 200 inches per minute. The total glass removed at the 14 stations is equal to about 0.025 inch. Following the rough and fine grinding in the 14 stations, the surface finish will have variations which are about 2 to 3 microinches R.M.S. It is further noted that the wheel life for the complete diamond grinding process will be above 2600 cubic inches of glass per carat, and will be considerably higher than this for some of the grinding stations.

Figure 5:
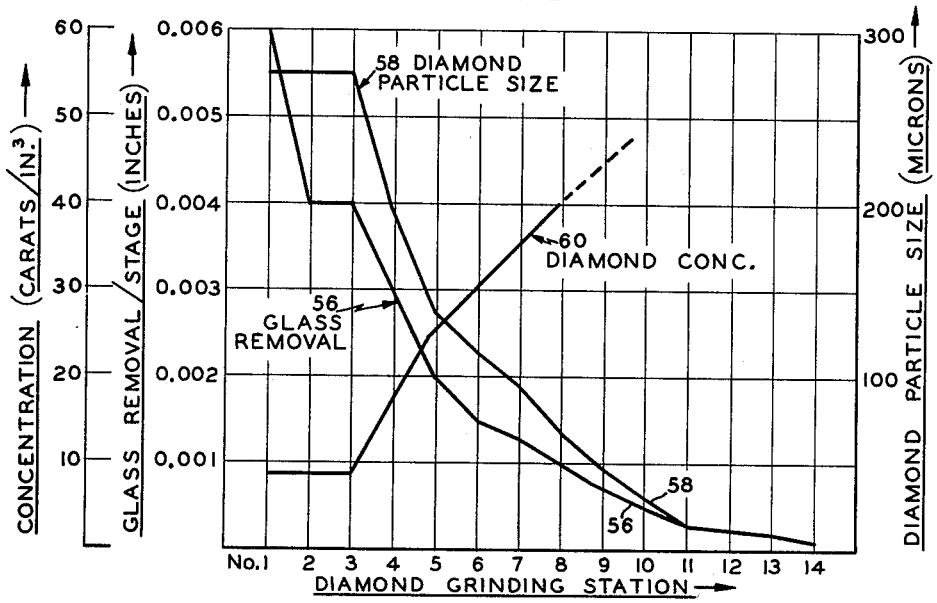
FIG. 5 is a set of plots showing certain details with regard to one specific diamond grinding process, in accordance with the present invention.

The plots presented in FIG. 5 of the drawings show some interesting facts about the 14 station grinding system. In FIG. 5, the glass removal, the diamond particle size, and the diamond concentration are plotted against various station numbers. Thus, glass removal is shown by plot 56 as extending from a maximum of 0.006 inch of stock removal at the first station down to 0.0001 inch, or 1/10,000 of an inch at the final or fourteenth diamond grinding station. The diamond particle size for the various stations is also shown by plot 58 in FIG. 5. The glass removal plot 56 and the particle size plot 58 are of the same general form, and, as a result of the scales which were selected, overlie each other at stations 11 through 14.

One interesting feature of plot 58 is the constant particle size for the first three stages of diamond grinding. This is a result of tests indicating that larger particle sizes produce undesirably high stresses in the glass, causing edge chipping and cracking of the glass, for example. In addition, with large diamond particle sizes and the relatively low diamond concentrations which are required, there is an unavoidable variation in the number of active diamonds which are at work. This factor changes the working properties of the diamond wheel to undesirable extent.

In FIG. 5 the diamond concentration is shown in plot 60 as an increasing characteristic. Thus, as the diamond particle size decreases, the diamond concentration increases.

Furthermore, it is desirable that the product of diamond particle size and diamond concentration be of the same order of magnitude in successive grinding stages. In this regard, it may be noted that at stations No. 1, No. 2 and No. 3, the diamond concentration is about 9 carats per cubic inch, and the particle size is about 275 microns, yielding a product of about 2475. At station No. 5 the average particle size is about 137 microns, and the concentration is 25 carats per cubic inch. The product of these two figures is 3425. At station No. 8 the average particle size is 68 microns, and the concentration is about 40 carats per cubic inch. The product of average particle size and concentration produces a product of 2720 in this case. The product of diamond concentration and of particle size thus averages at about 2900, and the products for the various stations as calculated above are all within 25 percent of this figure. In general therefore, they are of the same order of magnitude, i.e., none of the products depart from the average product by 50 percent or more.

Concerning certain other particulars for the specific complete system described above, the coolant concentration is 25 parts of water to one part of oil, and the grinding speed is approximately 2800 to 3000 surface feet per minute. In order to provide this speed at the periphery of the 10 foot grinding wheels, the spindles have a rate of rotation of approximately 90 to 95 revolutions per minute.

The foregoing specific glass grinding system and method is the result of studies of a great amount of test data. In the course of the tests, varying amounts of stocks were removed, different coolant concentrations and spindle speeds were employed, and grinding wheels with many different diamond concentrations and particle sizes were tested under many diverse conditions. In the following paragraphs, the significant results of many of these tests will be summarized.

Grinding speed tests

In a series of tests with a grinding wheel having grit size of 50 to 60 and a diamond concentration of 9 carats per cubic inch, the effect of varying the spindle speed was studied. In this test a coolant concentration of 50:1 and a downfeed rate of 0.004 inch were employed. The grinding wheel diameter was three inches.

Figure 6:
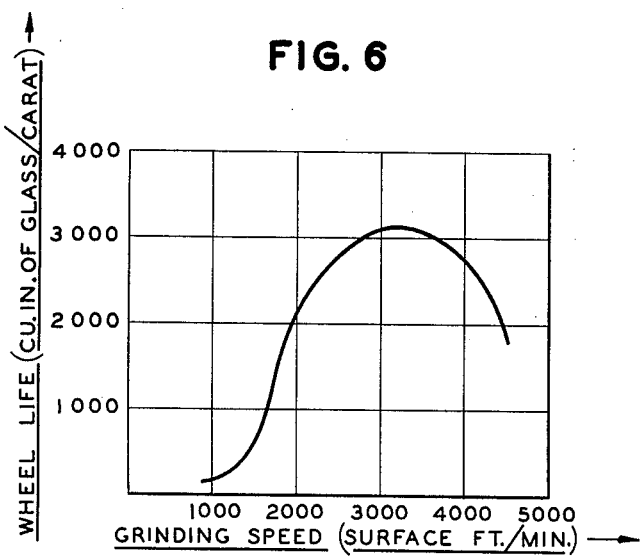
FIG. 6 is a plot showing the relationship of diamond grinding wheel life to grinding head speed in surface feet per minute.

The results of these tests are shown in graphical form in FIG. 6. As shown by this graph, the wheel life versus grinding speed curve has a broad maximum extending from slightly above 2,000 surface feet per minute to slightly above 4,000 surface feet per minute, with the maximum wheel life between 2,700 and 3,700 surface feet per minute.

Coolant concentration tests

The effect of coolant concentration on wheel life, surface finish and spindle power was extensively examined. FIG. 7 shows a representative set of plots indicating the increase in wheel life which is obtained through the use of richer coolant concentrations, i.e., more oil for a given amount of water. The upper dashed line plot in FIG. 7 is obtained using a downfeed of 0.0025 inch, while the lower plot represents operating conditions with a downfeed of 0.004 inch.

The tests of FIG. 7 were conducted with a 3 inch diameter metal bonded wheel having a grit size of 50 to 60, and a concentration of 9 carats per cubic inch. A speed of just under 3000 surface feet per minute was employed.

Tests were also made using richer coolant concentrations such as 12.5 to one. The slight additional increase in wheel life was not considered to justify the additional expense of doubling the amount of coolant oil and emulsifier to be employed.

It was also found that the spindle power increased appreciably with increase in the concentration in the coolant from 25 parts water to one part of oil and emulsifier to 100:1, for example. Increase in the concentration of a coolant also had the effect of improving the surface finish to some extent.

In addition to the tests made with the particular conditions described above, the effect of varying coolant concentration was examined for many other diamond wheels and test conditions. In general, it appears that a coolant concentration of approximately 25 to one is most suitable for the entire 14 stages of the grinding operation. However, with different types of commercially available grinding oil and different surface finish requirements, as well as other changes in grinding conditions, it is evident that other coolant concentrations may be employed. Thus the effect of coolant concentration is an important factor in combination with the complete grinding process.

Grit size tests

In considering the maximum grit size to be employed for the initial coarse grinding plate glass stages, extensive tests were made on the 20 to 30 grit size wheels. In these tests varying diamond concentrations including 4, 5, 9, and 18 carats per cubic inch were considered. In addition, varying speeds, feeds and coolant concentrations were employed. The maximum wheel life obtained in these tests was 1800 cubic inches of glass per carat.

This, of course, compares quite unfavorably with the wheel life of 2500 to 3000 cubic inches of glass per carat which is obtainable with 50 to 60 grit wheels. In addition, with downfeeds of 0.005 inch, selected as the minimum downfeed of interest for the 20 to 30 grit size, high glass stresses, producing glass breakage and excessive spindle power, were encountered. Furthermore, throughout the tests with the 20 to 30 grit size, excessive edge chipping of the plate glass was also encountered.

In addition to the extensive tests with relatively large particle sizes to determine the initial diamond cutting condiions, a large number of tests with intermediate and fine grit sizes and lesser infeeds have been completed. The illustrative detailed example set forth in Table I and the data included in FIG. 5 indicate the results of these tests.

Diamond concentration tests

A number of tests have been performed with diamond wheels having different concentrations of diamond in terms of carats per cubic inch. One typical set of data is shown in FIG. 8. In this figure of the drawings, plot 62 represents the wheel life, in cubic inches of glass per carat, plotted against diamond concentration in carats per cubic inch. To provide the data for FIG. 8, three wheels having diamond concentrations of 7.5, 9 and 18 carats per cubic inch, respectively, and all having 50–60 grit size, were tested under identical conditions. As shown in plot 62, the wheels having 9 and 18 carats per cubic inch had much higher efficiencies than the wheel having only 7 carats per cubic inch.

From the data shown in FIG. 8 and a number of additional comparative tests using wheels having 9 and 18 carats per cubic inch, it appears that the wheels with these two diamond concentrations are very nearly equal in wheel life. Thus, in some of the tests, the wheel life of the 9 carat per cubic inch wheel was slightly higher than the 18 carat per cubic inch wheel. The 9 carat wheel appeared to be easier to work with, however, and less "hard acting" than the 18 carat wheels. Thus, under equivalent grinding conditions, the 9 carat wheel produces less stress in the glass than the 18 carat wheel. The increase in stress in the glass with increasing diamond concentration is indicated by plot 64 in FIG. 8 in which an increase in power from 0.75 to 0.84 kilowatts is shown as a result of shifting from the 9 to 18 carat wheel.

A number of tests of the 80–120 grit size the 100–120, and also of the 200–230 grit size diamond grinding wheels were also made, with various diamond concentrations. In general, the results were favorable, and it is evident that wheel life above the average of 2600 cubic inches of glass per carat can be obtained with these sizes of grit. In the 100–120 grit size, wheels of 20, 30 and 40 carats per cubic inch were tested; and, in the 200–230 grit size, wheels of 30, 50, and 70 carats per cubic inch were tested. As a result of these grinding tests, and examinations of diamond concentrations in the grinding surfaces, indicating departures of the wheels from the nominal diamond concentrations, it was determined that concentrations of about 20 to 30 carats per cubic inch are to be preferred for the 100 to 120 grit size. Similarly, for the 200 to 230 grit size, concentrations of 30 to 50 carats per cubic inch are to be preferred.

It may also be noted in passing that with fine grit size, diamond wheel alignment becomes increasingly important. When the wheel is not properly aligned with the work surface, the wheel becomes burnished, and wheel life is reduced.

*Diamond grinding wheel construction*

The details of one specific grinding wheel arrangement will now be disclosed in connection with FIGS. 9 through 15 of the drawings. In general, FIGS. 9 and 10 show the supporting structure and certain diamond grinding segments assembled to the support, FIGS. 11 and 12 show holders for sets of three of the individual diamond grinding inserts, and FIGS. 13, 14 and 15 show the individual diamond grinding inserts in combination with their mounts.

The diamond grinding wheel support 18 shown in FIG. 9 has a central opening 70 and an outer periphery 72. As clearly shown in FIG. 10 (a sectional view diametrically across the grinding wheel of FIG. 9, but upside-down with relation to its normal operating position wherein the grinding elements would be positioned above the sheet of plate glass being surfaced), individual diamond grinding elements such as those designated 74 and 76 are mounted on one side 78 (normally the lower side) of the support 18. The other side 80 (normally the upper side) of the support is secured in engagement with the vertical spindle of a grinding machine such as those shown in FIGS. 1 and 2 of the drawings. Coolant holes 81 through 84 extend on an outward slant from the upper side 80 to the lower side 78 of the support. When coolant is supplied to these openings, it flows downwardly and outwardly toward the grinding area under the diamond grinding segments 74 and 76. In FIG. 10, three diamond segment holders 86, 88 and 120 are shown mounted on the side 78 of the support plate 72. These holders 86, 88 and 120 are secured to the support plate by the nuts 90, 91 and 92 which engage threaded extensions which are centrally attached to the holders 86, 88 and 120.

The diamond segment holders are shown in greater detail in FIGS. 11 and 12. As clearly shown in these figures, each segment holder includes a body portion 94, a centrally extending stud portion 96, and three recesses 98, 100 and 102. The diamond segment assemblies include a mount 104 and a diamond grinding element or segment 106. These assemblies are clearly shown in FIGS. 13, 14 and 15 of the drawing. The diamond grinding element is bonded to the mount 104 by a bonding material 108. Alternatively, these members may be welded or soldered in position. The diamond segment assemblies are secured in position by means of set screws (not shown) which extend through the tapped holes 110, 112 and 114 into engagement with the mounts. The countersunk hole 116 as shown in FIGS. 11 and 12 receives a cap screw which engages one of several tapped holes in the support plate to maintain the segment holders in the desired angular orientation, as discussed below.

In FIG. 9 a total of five segment holders are shown. These five segment holders are designated by the reference numerals 86, 88, 120, 122 and 124. The support plate 18 accommodates a total of 28 segment holders; for convenience in illustration, only five of these are shown in FIG. 9. As shown in FIG. 9, the diamond segments are in various angular orientations. This is accomplished as indicated in FIG. 16 by the use of a number of tapped holes which may be engaged by the screw passing through the opening 116 in the segment holder body 94 mentioned above in the description of FIGS. 11 and 12. This arrangement is clearly indicated in FIG. 16 which shows the larger holes 128 and 130 which receive the stud portions of two adjacent segment holders. In FIG. 16 the additional tapped holes 132 associated with the larger opening 128, and the series of tapped holes 134 for the adjacent stud opening 130, are clearly illustrated. By aligning the opening 116 in the body of a segment holder with the desired tapped hole 132 or 134 as shown in FIG. 16, any desired orientation of the segment holders may be obtained.

The diamond segment assemblies may be secured to the support member of FIG. 9 at desired angular orientations. Thus, they can be aligned with the periphery of the wheel as shown in the case of the segment holder 122; they may be mounted at an angle of 45° with respect to a radial line as shown by segment holder 88; or they may be oriented at an angle of 30° with respect to a radial line as indicated by the segment holders 86, 120 and 124. In some cases, it may be desirable to have all of the segments oriented at the angle of 30° as indicated by the three segments 86, 120 and 124. In other cases, alternate segment holders may be arranged at different orientations. Other variations to provide desirable grinding characteristics may also be provided. It is particularly to be understood that any arrangement of the twenty-eight diamond segment holders mounted on the lower side 78 of the support 18 may be employed. Specifically, all twenty-eight of these segments may be mounted with their angular orientation the same, at any of the angles permitted by the angular adjustment holes 132 and 134; or they may be alternated or sequenced with alternate sets of fourteen holders at different orientations, or with successive holders at four orientations, for example, so that every fourth holder is at the same orientation.

It may also be noted that the individual diamond segment assemblies may be rotated with respect to the segment holders. They are then held in position by the set screws in the tapped holes 110, 112 and 114 as shown in FIG. 11. In FIG. 9 the diamond segments in the wheels 88, 120, 122 and 124 are shown aligned with the three openings in the segment holders. In the case of segment holder 86, however, the diamond segments 74 are oriented transverse to the three openings in which the segment mounts are secured. This additional adjustment provides another degree of freedom for arranging the diamond segments on the face of the support member 18.

The diamond wheel as shown in FIGS. 9 and 10 may, for example, be slightly more than 10 feet in diameter. In this case, the various elements as shown in FIGS. 9 through 16 would be generally proportioned to this scale. A wheel of this diameter is intended to accommodate plate glass sheets 120 inches wide.

In one specific case, however, the support as shown in FIGS. 9 and 10 is 30 inches in diameter. The support has a thickness of 1½ inches, and the central opening 70 is just under 10 inches in diameter. The segment holders are just under 3 inches in diameter, and the centers of the segment holders define a circle having a diameter of approximately 25¾ inches. The individual diamond segments each have a surface area of approximately ¼ square inch. More specifically, the length of each of the diamond segments, such as that shown at 106 in FIGS. 13 through 15, is approximately ¾ of an inch, and the width is approximately ⅜ of an inch.

As mentioned above, the support member 18 carries 28 peripherally located diamond segment holders, and each segment holder supports three diamond segments. Multiplying the 84 diamond segments by the ¼ square inch surface area of each segment provides a total surface area of diamond matrix of approximately 21 square inches. In accordance with an important feature of the invention, this surface area is relatively small as compared with the total surface area of the grinding wheel. As mentioned above, the distance between the centers of the diamond segment holders is slightly more than 25 inches. The average radial location of the grinding segments is therefore about 12½ inches from the center of the grinding wheel. The area of the grinding wheel included within the circle defined by this average radial distance is approximately 490 square inches. The 21 square inch figure of actual diamond grinding surface is therefore less than 10 percent, and is even less than 5 percent of the 490 square inch surface area included within the circle defined by the average radial location of the grinding segments.

*Wheel face width*

The plots 142 and 144 of FIG. 17 reveal an unexpected effect. This is the pronounced effect of wheel face width on wheel life. The tests in each case refer to a 3 inch diameter wheel in which the metal bonded diamond matrix in contact with the plate glass was in the form of a continuous narrow peripheral area of circular configuration. The wheel face width figures employed for the plots of FIG. 17 represent the radial extent of the grinding area.

The plot 142 in FIG. 17 refers to a 50 to 60 grit wheel having a diamond concentration of 18 carats per cubic inch of matrix. The data was taken employing a coolant concentration of 100 parts of water to one part of oil and emulsifier. With these constants, the wheel face width shows a maximum at approximately a wheel face width of 0.24 inch.

In the case of plot 144 in FIG. 17, the grinding wheel was a 50 to 60 grit wheel having concentration of 9 carats per cubic inch, and the coolant concentration was 25 parts of water to one part of oil and emulsifier.

It is interesting to note that the wheel life, or efficiency, with the optimum wheel face width is more than twice the efficiency obtained with face widths which depart significantly from the optimum width. Another factor of interest is the shift in optimum wheel face width from approximately 0.24 for the 18 carat per cubic inch wheel to approximately 0.27 for the 9 carat per cubic inch wheel. Thus, the wheel face width is dependent on the concentration of diamonds, and should be less with higher diamond concentrations.

In the course of extensive additional tests, it was found that the optimum points as indicated in FIG. 17 did not shift to any significant extent with variations in coolant concentrations. It has also been determined that wheel face width is a significant factor at other grit sizes and grinding conditions.

With reference to the construction of the diamond wheel as shown in FIGS. 9 through 16, this design is in part a result of the wheel face width studies discussed above. By changing the orientation of the 28 segment holders mounted on the support plate, the effective wheel width of the diamond wheel may be changed. Thus, for example, the orientation of the diamond segments in holder 122 provides a relatively narrow face width, whereas that of segment holders 88, 120 and 124 provides a broader face width. The effective face width of the wheel may also be varied by rotating the individual diamond segment mounts as discussed above in connection with segment holder 86 as shown in FIG. 9.

The segments at the early stages of grinding in which the diamond concentration is relatively low, may be oriented to provide a moderately wide face width. At stations further down the grinding line, where the diamond concentrations are higher, it may have a reduced face width. This may be accomplished using wheels of the form shown in FIG. 9 by shifting the orientation of either or both the segment holders and mounts as discussed above. Also, if desired for the purpose of modifying wheel face width, the segment widths may be varied from the 3/8 inch dimension which has been noted above.

The diamond grinding wheel of FIGS. 9 and 10 is also designed to use segments of diamond matrix rather than a continuous grinding surface. In addition to advantages of adjustability as discussed above, it has been determined that a segmented wheel gives longer wheel life than a wheel in which a continuous diamond surface is employed. A further advantage of the arrangement shown in FIGS. 9 and 10 is the relatively low cost of the diamonds included in the wheel. This factor in combination with the high wheel life and adjustability, and the fact that different types of diamond segments may be employed in successive stations with the same type wheel support, all indicate the versatility and usefulness of the construction form shown in FIGS. 9 and 10.

With regard to the grinding process and apparatus described above, it is contemplated that various alternative arrangements may be used. Thus, instead of a single grinding head extending across the entire width of the plate glass, two or more grinding wheels having overlapping work areas may be used.

Similarly, instead of processing one side of the plate glass at a time, both sides may be processed simultaneously, with grinding wheels located above and below the plate glass. With this last mentioned arrangement, the glass must, of course, be adequately supported opposite the active grinding wheels, and by bearing surfaces toward the center of the underlying grinding wheels.

It is also noted that the stock removal at successive stations is designed to minimize the number of stations which are required, consistent with an average wheel life of 2600 or more cubic inches of glass removed per carat. With higher glass conveyor feed rates in inches per minute, the process could be modified by reducing the amount of stock removed at each station while maintaining the same efficiency. Similarly, coolant concentrations may be made leaner, down to 200, 500, or even 1,000 parts of water to one part of oil, in some cases. As noted above, this tends to increase the stresses in the plate glass, and require reduction in stock removal. Thus, to compensate for higher conveyor rates or leaner coolant concentrations, the depth of stock removal per stage may be reduced and the number of stations increased as compared with the data of Table I. In the case of the higher conveyor speeds, approximately the same amount of glass would be removed per station; while in the case of the leaner coolant concentrations, lesser amounts of glass would be removed per station. In each case of the diamond wheel life, in terms of cubic inches of glass removed per carat, would be approximately the same. The advantages of leaner coolant concentrations include reduction in coolant cost and some improvement in surface finish.

The amount of glass which is removed at each station may be expressed as in Table I in terms of the thickness of the layer of glass which is ground away. Alternatively, it may be expressed in terms of cubic inches of glass removed per minute per inch of width of grinding surface. Thus, with a feed speed of 200 inches per minute, and stock removal of 0.006 inch, the rate of stock removal for Station No. 1 of Table I is 1.2 cubic inches of glass per minute for each inch of diameter of the grinding wheel. In subsequent stations the rate of stock removal goes down to about 0.02 cubic inch per minute per inch of width of grinding surface, at the last station.

Various advantages of the present invention have been discussed above. These include reduction in machinery, floor space, material-handling facilities and the like. In addition, it may be noted that the diamond wheels do not require truing or dressing throughout their useful life. Thus, one of the adverse factors which is often associated with diamond grinding is not present in the process and system of this invention.

Another important advantage of the present invention is the relative purity of the glass particles which are removed by diamond grinding. This is in sharp contrast to the admixture of sand and glass obtained by the beach sand grinding method previously employed. With reference to FIG. 1 of the drawings, the coolant system 30 includes conventional arrangements for separating the glass powder from the coolant, including filtering and settling apparatus, for example. The resultant clean and well defined glass powder is a valuable by-product of the process.

The specific data and the illustrative process described above are based on commercially available plate glass of the usual type. It is to be understood that there are some slight variations in the hardness of glass; however, this will not affect the results set forth above to any considerable extent. However, in the case of glass or other materials which are somewhat harder or softer than the standard plate glass which is presently available, corresponding changing in grinding feeds and speeds would be necessary. Thus, for example, harder glass would require cuts of less depth, smaller conveyor feed rates, or similar changes in the grinding conditions. Similarly, with softer glass or other material, higher feed rates and speeds and deeper cuts would be practical.

In the present specification and claims the term "diamond" is widely employed. It is to be understood that this term applies both to natural and synthetic abrasives having the approximate hardness or other abrasive qualities of diamonds.

It is to be understood that the above described arrangements are illustrative of the application of the principles of the invention. Numerous other arrangements may be devised by those skilled in the art without departing from the spirit and scope of the invention.

I claim:

1. Apparatus for the continuous surfacing of the principal surfaces of a sheet of plate glass and the like, comprising a plurality of grinding stations arranged seriatim in a grinding line, means for advancing the sheet of plate glass successively through each of said plurality of grinding stations, each of said grinding stations including a grinding wheel having a generally annular abrasive grinding face of predetermined effective radial width with diamond particles bonded therein, said effective radial width being of a size equal to or less than 0.36 inch, a first one of said plurality of diamond grinding stations having said diamond particles in said grinding face in a predetermined concentration, a successive one of said plurality of diamond grinding stations having a respectively higher concentration of diamond particles, the average particle size of said diamond particles in each of said first and said successive grinding stations being substantially within a range of from 275 to 68 microns, and means for intromissively supplying coolant between said grinding face of each of said diamond grinding wheels and the surface of the sheet of plate glass being ground thereby.

2. Apparatus for the continuous surfacing of the principal surfaces of a continuing sheet of plate glass and the like, comprising a plurality of diamond grinding stations arranged seriatim in a grinding line, means for advancing the sheet of plate glass successively through each of said plurality of grinding stations, each of said grinding stations including a grinding wheel having a generally annular abrasive grinding face of predetermined effective radial width with diamond particles bonded therein, said effective radial width being of a size equal to or less than 0.36 inch, successive ones of said plurality of diamond grinding stations respectively having progressively higher concentrations of said diamond particles in said grinding face, the average particle size of said diamond particles in each of said first and said successive grinding stations being substantially within a range of from 275 to 68 microns, and means for intromissively supplying coolant between said grinding face of each of said diamond grinding wheels and the surface of the sheet of plate glass being ground thereby.

3. Apparatus as claimed in claim 2, wherein said average particles size of said diamond particles in each of said diamond grinding wheels progressively decreases in each successive station with respect to the preceding diamond grinding station.

4. Apparatus as claimed in claim 2, wherein the respective concentrations of said diamond particles in each of three of said successive grinding stations are substantially in the order of 9 carats per cubic inch, 25 carats per cubic inch, and 40 carats per cubic inch.

References Cited by the Examiner

UNITED STATES PATENTS

| | | | |
|---|---|---|---|
| 2,198,377 | 4/40 | Dunbar et al. | 51—103.1 X |
| 2,578,789 | 12/51 | Donnelly | 51—110 |
| 2,945,330 | 7/60 | Peyches | 51—283 X |
| 3,007,288 | 11/61 | Brewin | 51—110 |

J. SPENCER OVERHOLSER, *Primary Examiner.*

FRANK E. BAILEY, *Examiner.*